United States Patent [19]

Brown et al.

[11] Patent Number: 4,901,675
[45] Date of Patent: * Feb. 20, 1990

[54] MEANS AND METHOD FOR CONTROLLING LOAD TURNDOWN IN A FLUIDIZED BED COMBUSTOR

[75] Inventors: Robert C. Brown; William H. Buttermore, both of Ames, Iowa

[73] Assignee: Iowa State University Research Foundation, Inc., Ames, Iowa

[*] Notice: The portion of the term of this patent subsequent to Aug. 9, 2005 has been disclaimed.

[21] Appl. No.: 331,002

[22] Filed: Mar. 27, 1989

Related U.S. Application Data

[63] Continuation of Ser. No. 162,278, Feb. 29, 1988, abandoned, which is a continuation of Ser. No. 907,110, Sep. 15, 1986, Pat. No. 4,762,090.

[51] Int. Cl.⁴ .............................................. B09B 3/00
[52] U.S. Cl. ....................................... 122/4 D; 431/7; 431/170; 110/763; 110/347
[58] Field of Search .................... 431/7, 170; 122/4 D; 110/245, 263, 347

[56] References Cited

U.S. PATENT DOCUMENTS

| | | | |
|---|---|---|---|
| 2,121,733 | 6/1938 | Cottrell | 431/170 |
| 2,842,102 | 7/1958 | Blaskowski | 122/4 D |
| 4,249,472 | 2/1981 | Mitchell | 110/245 |
| 4,321,233 | 3/1982 | Tsuji et al. | 431/7 |
| 4,338,283 | 7/1982 | Sakamoto et al. | 431/170 |
| 4,455,969 | 6/1984 | Barker | 122/4 D |
| 4,476,816 | 10/1984 | Cannon et al. | 122/4 D |
| 4,490,157 | 12/1984 | Fernandes | 48/62 R |
| 4,762,090 | 8/1988 | Brown et al. | 431/170 |

FOREIGN PATENT DOCUMENTS 2408649 9/1974 Fed. Rep. of Germany.
231409 12/1985 German Democratic Rep..

Primary Examiner—Carroll B. Dority
Attorney, Agent, or Firm—Zarley, McKee, Thomte, Voorhees & Sease

[57] ABSTRACT

A means and method of controlling the load turndown in a fluidized bed combustor including a fluidized combustion bed having an independent fluidization air source. A separately fluidizable heat transfer bed surrounds the fluidized combustion bed. By independently adjusting the fluidization of the heat transfer bed, the load turndown of the fluidized bed combustor can be accurately and efficiently controlled.

16 Claims, 1 Drawing Sheet

MEANS AND METHOD FOR CONTROLLING LOAD TURNDOWN IN A FLUIDIZED BED COMBUSTOR

This is a continuation of application Ser. No. 162,278 filed 2-29-88 and now abandoned, and that application is a continuation of application Ser. No. 907,110 filed 7-15-86 and now patent no. 4,762,090.

BACKGROUND OF THE INVENTION a. Field of the Invention.

This invention relates to fluidized bed combustors, and in particular, a means and method for controlling the load turndown ratio in a fluidized bed combustor.

b. Problems in the Art.

Combustion of fuel in a fluidized bed is a conventional and well-known process. The advantages of fluidized bed combustion include, but are not limited to, high rate of heat transfer between the hot bed material containing the burning fuel and the wall enclosing the bed, the ability to handle a wide variety of fuel types, and the ability to enact pollution control and treatments.

A significant problem exists, however, with fluidized combustion bed systems. While heat transfer capabilities between the combusting fuel and the wall of the combustion bed are improved by the fluidization material, the ability to control the rate of heat transfer, called the load turndown for the bed, is very limited.

In many cases, the fluidized bed combuster is utilized to produce heat or steam. Depending on the use, it is many times desirable to be able to closely control and vary the combustor output, which is controlled by the heat transfer rate or load turndown. While an obvious method of controlling turndown ratio is to increase or decrease combustion in the fluidized bed, which would produce a corresponding increase or decrease in heat, doing so can have adverse effects on both combustion efficiency and pollution emissions, both of which are primary parameters in most combustion environments.

A variety of methods have been attempted to allow control of load turn down without deleterious effects to combustion efficiency and pollution control. As discussed above, if bed temperature is changed, efficiency is compromised as well as pollution control. Furthermore, temperature change itself is limited by combustion processes themselves.

Another method varies the fluidization air in different sections of the fluidization bed to produce partial bed slumping which in turn reduces active in-bed heat transfer areas. Primary problems with this method are that air leakage to the slumped side causes agglomeration, and splash causes bed material transfer to the slumped side and makes any restarting in that side difficult.

The method of reducing fluidized bed height by reducing the velocity of fluidization air (called "velocity turndown") results in erosion of tubes in the splash zone, and a bed height change is insufficient for large margin turndowns.

Reducing in-bed heat transfer area by actually discharging some of the bed materials also results in erosion of tubes in the splash zone and presents very troublesome particles handling problems.

Independent fluidization or aeration of a separated bed section (called a "wing panel") is insufficient because the heat transfer coefficient is insensitive or too insensitive to such velocity change, and this system is limited to small combustion units.

The prior methods of controlling load turndown in a fluidized bed combustor have many practical difficulties and can provide only partial control of load turndown.

It is therefore a primary object of the present invention to provide a means and method for controlling load turndown in a fluidized bed combustor which improves over or solves the problems and deficiencies in the art.

Another object of the invention is to provide a means and method for controlling load turndown in a fluidized bed combustor which allows a wide variation in load turndown without adverse effects on combustion efficiency and pollution emissions.

A further object of the invention is to provide a means and method for controlling load turndown in a fluidized bed combustor which allows control of the load turndown independent from control of the combustion of the fluidized bed combustor.

Another object of the invention is to provide a means and method for controlling load turndown in a fluidized bed combustor which is simple, efficient, and precisely controllable.

These and other objects, features, and advantages of the invention will become apparent with reference to the accompanying specification and drawings.

SUMMARY OF THE INVENTION

The present invention utilizes a conventional fluidized combustion bed. The fluidized combustion bed is comprised of and bounded by a container which contains the fuel, bed material, and fluidization air which combine during the combustion process. A second container defining a second fluidization bed called a fluidized heat transfer bed, surrounds the container defining the fluidized combustion bed.

The fluidized combustion bed and fluidized heat transfer bed each have independent and separately controlled fluidization air inputs so that different degrees of fluidization can be achieved in each. The exhaust output from the fluidized combustion and heat transfer beds can be either separately outletted, or combined. If combined, this exiting fluidized air can be used as secondary air for combustion.

The load for the fluidized bed combustor can be, but is not limited to, a water jacket which directly surrounds the fluidized heat transfer bed. It is to be understood, however, that other known in the art loads can be used in combination with the present invention.

Load turndown can be precisely controlled over a wide variation by instigating and maintaining combustion in the fluidized combustion bed, as is well known in the art, utilizing the separate fluidization input air to maintain efficient combustion with minimal pollution. By varying the fluidization air level entering the fluidized heat transfer bed from its separate source, the rate of heat transfer from the fluidized combustion bed to the load can be accurately controlled, all without loss in efficiency of combustion or increase in pollution emission.

DETAILED DESCRIPTION OF THE PREFRRED EMBODIMENT

Figure 1:
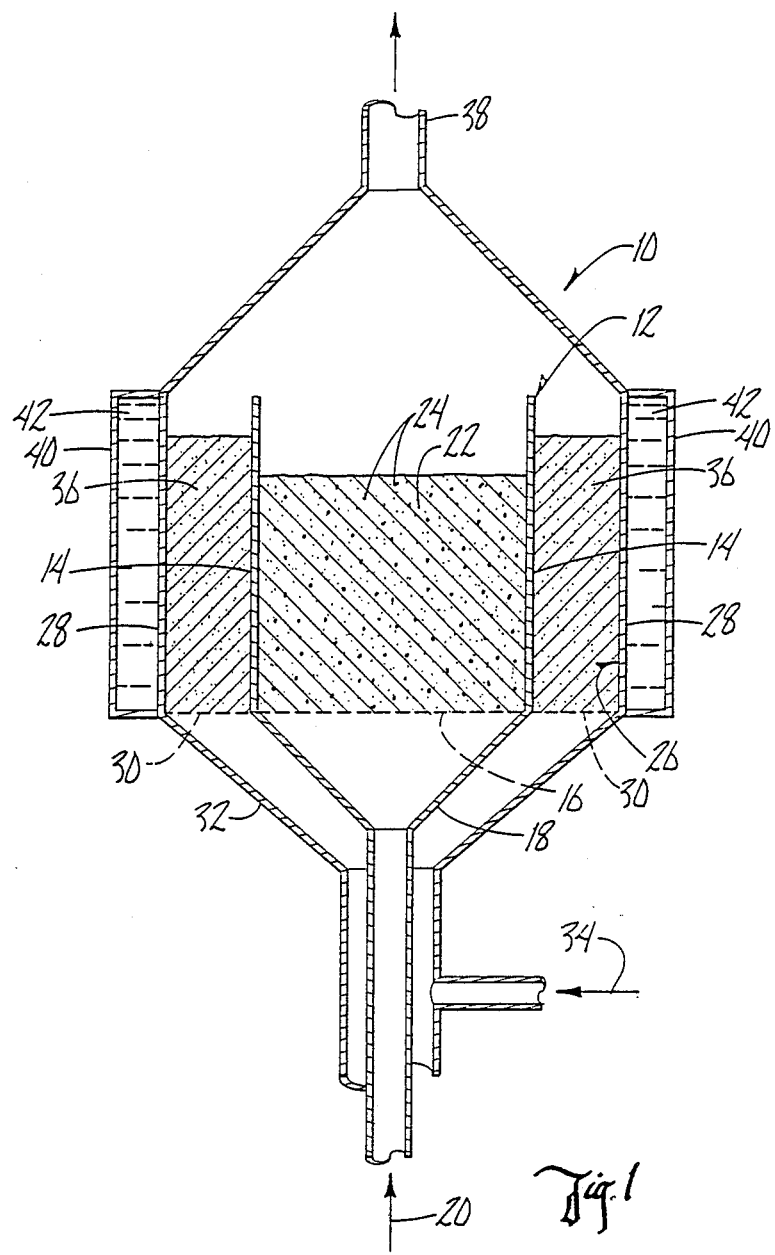
FIG. 1 is a schematic cross-sectional view of one embodiment of the invention.

In reference to FIG. 1 of the drawings, there is shown schematically a fluidized bed combustor 10 according to the invention. A fluidized combustion bed is defined by container 12 having vertical walls 14 and a bottom fluidization air distributor plate 16. Fluidization air is supplied through air plenum 18 which is connected to an independently controllable fluidization air source 20.

The contents of container 12 for the combustion bed are a combination of bed material such as sand or other granular material known in the art (reference numeral 22) and fuel, for example coal (reference numeral 24). Fuel is inputted into container 12 by means conventional and known in the art, and which are not shown in FIG. 1. Container 12 is constructed to retain the bed material 22 and fuel 24 during combustion and over the range of fluidization air pressure levels for the fluidized combustion bed.

In FIG. 1, container 12 is cylindrical in shape. A second annular container 26 surrounds container 12. Annular container 26 has cylindrical vertical walls 28 and an annular air distributor plate 30 which extends between vertical walls 28 and vertical walls 14 of container 12.

A second air plenum 32 channels fluidization air from an independent, separately controllable fluidization air source 34 into annular container 26 which contains only bed material 36 (sand or other granular material).

Both container 12 and annular container 26 open to a common exhaust outlet 38. Air exiting the heat transfer bed serves as secondary air for combustion by mixing it with the combustible gas exiting the combustion bed. After combustion is completed, the gas mixture is removed at exhaust outlet 38.

Directly adjacent to and annularly surrounding vertical walls 28 of annular container 26 is an annular water jacket 40 containing water 42. Water 42 in annular jacket 40 receives heat from the combustion bed transferred through the heat transfer bed and is transformed into hot water or steam for further use.

Operation of the invention is as follows. Fuel is introduced and ignited in the combustion bed to initiate heat producing combustion. Fluidization air is introduced into the combustion bed through air plenum 18 to fluidize the combustion bed to promote combustion and to enhance heat transfer from the burning fuel to bed material 22 and ultimately to vertical walls 14. This heat transfer is at a high and efficient rate as is known with fluidized bed combustors.

Combustion in the combustion bed is controlled by introduction of fuel and fluidization air to produce the level of combustion desired and the most efficient combustion possible consistent with minimized pollution emissions.

The amount of heat allowed to be transferred to the water jacket is then controlled by the independent control of fluidization air through air plenum 32 to the heat transfer bed.

Overall heat transfer rate to water jacket 40 is determined by the heat transfer coefficients associated with the combustion bed and the heat transfer bed and water jacket 40. In the present invention, only the heat transfer coefficient associated with the heat transfer bed is manipulated to control the overall heat transfer rate, that is, the boiler load. If no air is passed through the heat transfer bed, then the unfluidized bed has the poor heat transfer characteristics of packed granular material. If only sufficient air is passed through the heat transfer bed to minimally fluidize the bed, then increased heat transfer due to convection occurs. Finally, if the heat transfer bed is violently fluidized, enhanced heat transfer characteristic of a bubbling fluidized bed occurs. A continuous and large variation in heat transfer rate can be produced in going from unfluidized to violently fluidized states.

The load turndowns that can be achieved depend on the radial dimension of the heat transfer bed, and the type of material which is used in the heat transfer bed. For a typical one inch radical dimension heat transfer bed, the ratio of maximum to minimum load is ten.

The included preferred embodiment is given by way of example only, and not be way of limitation to the invention, which is solely described by the claims herein. Variations obvious to one skilled in the art will be included within the invention defined by the claims.

For example, the preferred embodiment of FIG. 1 depicts "fire-tube" boiler construction in which the water is contained in a large pressure vessel. Alternative boiler designs, such as "water-tube" construction in which the water is contained in an array of small diameter tubes, could also be utilized in accordance with the invention.

Many different conventional known in the art methods and apparatus can be used to introduce fuel for combustion into container 12.

Different configurations for air plenums 18 and 32, as well as separate exhaust outlets for each fluidized bed, could be utilized.

Additionally, different furnace loads can be used, such as are known in the art.

What is claimed is:

1. A method of controlling the load turndown in a fluidized bed combustor, the load comprising one or more chambers having a fluid, comprising the steps of:
    combusting fuel in a fluidized combustion bed;
    surrounding the fluidized combustion bed with a separately fluidized heat transfer bed that is free from combustion, the load surrounding the heat transfer bed; and
    adjusting the fluidization of the heat transfer bed to control the load turndown to control the rate of heat transfer to the load.

2. The method of claim 1 wherein said fluidized combustion bed and said fluidized heat transfer bed are fluidized from independent fluidization air sources.

3. The method of claim 1 wherein exiting air and gases from the combustion bed and the heat transfer bed are combined.

4. The method of claim 1 wherein the combustion bed is separated from the heat transfer bed by a wall.

5. The method of claim 4 wherein the heat transfer bed is defined by the wall between the combustion bed and the heat transfer bed and a second annular wall.

6. The method of claim 1 wherein each fluidized bed contains a bed material to be fluidized, said bed material being a granular material.

7. The method of claim 1 wherein adjusting the fluidization comprises altering the amount of fluidization air introduced into the heat transfer bed.

8. The method of claim 1 further comprising surrounding at least a portion of the heat transfer bed with at least one water jacket whereby controlled alteration of the load turndown controls the rate of heat transfer to any water jacket.

9. The method of claim 8 wherein the heat transfer bed and each water jacket are separated by a wall.

10. A fluidized bed combustor for improving the control of load turndown, the load comprising one or more chambers having a fluid, comprising:

a first chamber defining a fluidized combustion bed to contain fuel for combustion bed material to be fluidized, and the combustion process;

a second chamber that is free from combustion defining a separately fluidizable heat transfer bed surrounding the fluidizable combustion bed and containing bed material to be fluidized;

the load surrounding the heat transfer bed; and so that by controlling the fluidization of said heat transfer bed, the load turndown of the fluidized bed combustor can be accurately controlled to control the rate of heat transfer to the load.

11. The fluidized bed combustor of claim 10 wherein the first chamber comprises a container having at least continuous side walls and a bottom wall to contain and support the bed material and fuel but having means to allow introduction of fluidization air into the interior of the first chamber.

12. The fluidized bed combustor of claim 10 wherein the bed material of the combustion bed and the heat transfer bed is made of a granular material.

13. The fluidized bed combustor of bed 10 wherein the second chamber is comprised of an annular container defined by a wall bordering the combustion bed, a second spaced-apart annular wall, and a bottom wall to support the bed material but having means to allow introduction of fluidization air into the interior of the second chamber.

14. The fluidized bed combustor of claim 10 wherein the combustion bed and the heat transfer bed have independent fluidization air sources.

15. The fluidized bed combustor of claim 10 further comprising at least one water jacket surrounding at least a portion of the heat transfer bed whereby controlled alteration of the load turndown controls the rate of heat transfer to the water jacket.

16. The fluidized bed combustor of claim 10 wherein fluidization of the combustion bed and the heat transfer bed is independently controlled by separately altering the amount of fluidization air introduced into the combustion bed and the heat transfer bed respectively.

* * * * *